United States Patent
Nakai et al.

(10) Patent No.: US 7,964,165 B2
(45) Date of Patent: Jun. 21, 2011

(54) SEPARATION METHOD FOR ZINC SULFIDE

(75) Inventors: Osamu Nakai, Tokyo (JP); Yoshitomo Ozaki, Tokyo (JP); Keisuke Shibayama, Tokyo (JP); Takao Ooishi, Tokyo (JP); Satoshi Matsumoto, Tokyo (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 12/458,796

(22) Filed: Jul. 23, 2009

(65) Prior Publication Data

US 2010/0034716 A1    Feb. 11, 2010

(30) Foreign Application Priority Data

Aug. 7, 2008 (JP) ................... 2008-204111

(51) Int. Cl.
*C22B 23/00* (2006.01)

(52) U.S. Cl. ........ 423/101; 423/102; 423/109; 423/140; 423/141; 423/142; 423/150.1; 423/566.1; 423/561.1

(58) Field of Classification Search .......... 423/101–109, 423/140–150.1, 561.1, 566.1
See application file for complete search history.

(56) References Cited

U.S. PATENT DOCUMENTS

| 4,049,770 A * | 9/1977 | Swinkels et al. ........... 423/37 |
| 7,563,421 B2 * | 7/2009 | Kobayashi et al. ........ 423/140 |
| 2005/0265910 A1 * | 12/2005 | Kobayashi et al. ........ 423/140 |

FOREIGN PATENT DOCUMENTS

| JP | 06-116660 A | 4/1994 |
| JP | 2005-350766 A | 12/2005 |

* cited by examiner

*Primary Examiner* — Steven Bos
(74) *Attorney, Agent, or Firm* — Edwards Angell Palmer & Dodge LLP

(57) ABSTRACT

The separation method for zinc sulfide, in the hydrometallurgical process by a High Pressure Acid Leach for nickel oxide ore comprising leaching and solid/liquid separation step, neutralization step, zinc removal step, and nickel recovery step, which can inhibit clogging of a filter cloth and reduce a frequency of washing operation and replacement operation of a filter cloth by improving filtration performance of zinc sulfide, and inhibit decrease of nickel recovery ratio, in the zinc removal step in which zinc sulfide is formed by adding a sulfurizing agent to the neutralization final liquid containing zinc as well as nickel and cobalt and zinc sulfide is separated to obtain a mother liquid for nickel recovery containing nickel and cobalt.

The separation method for zinc sulfide of the present invention is characterized in that in the above-described neutralization step, the leach residue is added to the leach liquor, and pH of the neutralization final liquid is adjusted so as to fall to the range from 3.0 to 3.5, and in the zinc removal step, the suspended solid comprising the neutralized precipitate and the leaching reside are kept remained in said neutralization final liquid so that turbidity thereof falls in the range from 100 to 400 NTU.

12 Claims, 1 Drawing Sheet

SEPARATION METHOD FOR ZINC SULFIDE

BACKGROUND OF THE INVENTION

1. Field of the Invention

The present invention relates to a separation method for zinc sulfide, in more detail, relates a separation method for zinc sulfide, in hydrometallurgy by a High Pressure Acid Leach for nickel oxide ore comprising a leaching and solid/liquid separation step, a neutralization step, a zinc removal step, and a nickel recovery step, which can improve filtration performance of zinc sulfide to be formed and inhibit decrease of nickel recovery ratio, in the zinc removal step in which zinc sulfide is formed by adding a sulfurizing agent to the neutralization final liquid containing zinc as well as nickel and cobalt and then said zinc sulfide is separated to obtain a mother liquid for nickel recovery containing nickel and cobalt.

2. Description of the Prior Art

In recent years, a High Pressure Acid Leach using sulfuric acid has been attracting attention as hydrometallurgy for nickel oxide ore. This process is advantageous in energy and cost because the process consists of a consistent hydrometallurgical step without including a dry step such as reduction and drying process, differing from a pyrometallurgy which is a conventional general refining process for nickel oxide ore, and further the process has an advantage that a sulfide containing nickel and cobalt having an increased nickel content up to around 50% by mass (hereinafter, may be referred to as nickel cobalt mixed sulfide) can be obtained.

The above-described High Pressure Acid Leach process comprises, for example, the following steps:

(a) a leaching and solid/liquid separation step in which sulfuric acid is added to a slurry of nickel oxide ore, leaching is conducted under a high temperature and pressure, then the residue is separated while the leaching slurry is subjected to a multistage washing, to obtain a leach liquor containing impurity elements as well as nickel and cobalt;

(b) a neutralization step in which pH of the above leach liquor is adjusted and neutralized precipitate containing impurity elements is separated, to obtain a neutralization final liquid containing zinc as well as nickel and cobalt.

(c) a zinc removal step in which zinc sulfide is formed by adding a hydrogen sulfide gas to the above neutralization final liquid and said zinc sulfide is separated, to obtain a mother liquid for nickel recovery containing nickel and cobalt; and (d) a nickel recovery step in which mixed sulfide containing nickel and cobalt are formed by adding a hydrogen sulfide gas to the above mother liquid for nickel recovery, and said mixed sulfide are separated.

Here, in the neutralization step, for example, the leach liquor obtained from the above leaching and solid/liquid separation step is introduced into a neutralization tank, neutralized by adding a calcium carbonate slurry, and the resultant precipitation of hydroxides is separated by a solid/liquid separation, to obtain a neutralized precipitate and a neutralization final liquid.

In addition, in the zinc removal step, the above neutralization final liquid is introduced into a sulfurization reaction tank, a sulfurizing agent such as hydrogen sulfide gas, sodium hydrosulfide is added thereto to sulfurize zinc, copper, etc. contained in said neutralization final liquid, after that, a solid/liquid separation is conducted using a filter press etc., to obtain zinc sulfide and a mother liquid for nickel recovery (see, for example, Patent Literatures 1 and 2) containing nickel an cobalt. Incidentally, since the mixed sulfide obtained in the above-described High Pressure Acid Leach are further used as a raw material to refine up to electrolytic nickel and electrolytic cobalt, in the zinc removal step, a Zn concentration in the final liquid is required to be decreased to 0.001 g/L or less.

Meanwhile, when the method to separate zinc as a zinc sulfide as described above is employed in a practical plant of the hydrometallurgy for nickel oxide ore by the above High Pressure Acid Leach, since clogging of filter cloth occurs in the filtration and separation of the sulfide formed using a filter cloth, washing operation and replacement operation of a filter cloth had been carried out to improve filtration rate. Moreover, a frequency of washing operation or replacement operation of the filter cloth had been widely fluctuated from around once per several days to around once per several hours. Namely, generally in the sulfurization reaction using hydrogen sulfide of sulfuric acid aqueous solution containing zinc as well as nickel and cobalt, due to the reaction in which sulfide precipitate consisting of fine particles is formed, the sulfide formed covers the surfaces of controlling instruments such as electrode to make an accurate measurement of pH difficult, furthermore, due to occurrence of clogging of a filter cloth in filtration and separation using the filter cloth of the sulfide formed, filtration rate gradually decreases and finally does not proceed. For this reason, when washing operation or replacement operation of the filter cloth to improve the filtration rate is frequent, it had become a factor which greatly impairs an operational efficiency. Further, the sulfide having such a poor filtration performance had been accompanied by nickel and cobalt together with adhered water, and discharged out of the system to be lost.

In order to solve this problem, generally known improvement measures such as addition of a flocculant to agglomerate the sulfide precipitate consisting of fine particles etc. were tried, but no effective result was obtained in any case.

In view of the above circumstance, in a method in which zinc sulfide is formed by adding a hydrogen sulfide gas to a sulfuric acid aqueous solution containing nickel, cobalt and zinc and said zinc sulfide is separated, a separation method for zinc sulfide which can improve the filtration performance of zinc sulfide formed has been demanded.

[Patent Literature 1] JP-A-06-116660 (Pages 1 and 2)
[Patent Literature-2] JP-A-2005-350766 (Pages 1 and 2)

SUMMARY OF THE INVENTION

In view of the above-described problems in the above-described conventional technology, an object of the present invention is to provide a separation method for zinc sulfide in hydrometallurgy by a High Pressure Acid Leach for nickel oxide ore comprising a leaching and solid/liquid separation step, a neutralization step, a zinc removal step, and a nickel recovery step, which can improve filtration performance of zinc sulfide to be formed, and inhibit decrease of nickel recovery ratio, in the zinc removal step in which zinc sulfide is formed by adding a sufurizing agent to the neutralization final liquid containing zinc as well as nickel and cobalt and then said zinc sulfide is separated, to obtain a mother liquid for nickel recovery containing nickel and cobalt.

In order to attain the above-described object, the present inventors have intensively studied on the zinc removal step to obtain a mother liquid for nickel recovery containing nickel and cobalt by forming zinc sulfide by adding a hydrogen sulfide gas to a neutralization final liquid containing zinc as well as nickel and cobalt and separating said zinc sulfide, in the hydrometallurgy by a High Pressure Acid Leach for nickel oxide ore comprising leaching and solid/liquid separation step, neutralization step, zinc removal step, and nickel recovery step. As a result, the inventors have found that when the leach residue is added to the leach liquor and pH is adjusted so as to fall in a particular range in the neutralization step and a suspended solid comprising the neutralized precipitate and the leach residue is kept remained in said neutralization final liquid so that turbidity falls in a particular range in the zinc removal step, filtration performance of zinc sulfide formed can be stably improved and a loss of nickel can be reduced, and accomplished the present invention.

Namely, according to the first aspect of the present invention, in the hydrometallurgy by a High Pressure Acid Leach for nickel oxide ore comprising the following steps, there is provided a separation method for zinc sulfide, characterized in that, in the following neutralization step, the following leach residue is added to the leach liquor and pH of the following neutralization final liquid is adjusted so as to fall in the range from 3.0 to 3.5, and in the following zinc removal step, a suspended solid comprising the neutralized precipitate and the leach residue is kept remained in said neutralization final liquid so that turbidity thereof falls in the range from 100 to 400 NTU. Here, NTU (Nephelometric Turbidity Unit) is a unit of turbidity obtained by measuring a scattered light with using a polystyrene turbidity standard solution or Forumajin standard solution as a standard solution.

(a) A leaching and solid/liquid separation step in which sulfuric acid is added to a slurry of nickel oxide ore, leaching is conducted under a high temperature and pressure, then the residue is separated while the leached slurry is subjected to a multistage washing, to obtain a leach liquor containing impurity elements as well as nickel and cobalt, (b) a neutralization step in which pH of the above leach liquor is adjusted and neutralized precipitate containing the impurity elements is separated, to obtain a neutralization final liquid containing zinc as well as nickel and cobalt, (c) a zinc removal step in which zinc sulfide is formed by adding a hydrogen sulfide gas to the above neutralization final liquid and said zinc sulfide is separated, to obtain a mother liquid for nickel recovery containing nickel and cobalt, and (d) a nickel recovery step in which mixed sulfide containing nickel and cobalt are formed by adding a hydrogen sulfide gas to said mother liquid for nickel recovery, and said mixed sulfide are separated.

In addition, according to the second aspect of the present invention, there is provided the separation method for zinc sulfide, characterized in that in the first aspect, an amount of the leach residue to be added to the leach liquor is 7 to 22.5 g per 1 L of said leach liquor.

In addition, according to the third aspect of the present invention, there is provided the separation method for zinc sulfide, characterized in that in the second aspect, said leach residue is adjusted to the leach residue slurry having a concentration within the range from 1.4 to 1.5 t/m$^3$, then said leach residue slurry is added in a flow rate of 0.5 to 1.5% by mass relative to said leach liquor.

In addition, according to the fourth aspect of the present invention, there is provided the separation method for zinc sulfide, characterized in that in any one of the first to the third aspects, the above adjustment of turbidity is carried out by adjusting an addition amount of a flocculant in the above neutralization step to adjust an amount of the suspended solid comprising the neutralized precipitate and the leach residue in the neutralization final liquid.

In addition, according to the fifth aspect of the present invention, there is provided the separation method for zinc sulfide, characterized in that in any one of the first to the third aspects, in the above zinc removal step, a suspended solid comprising zinc sulfide as well as the above neutralized precipitate and the leach residue is formed by further adding the above zinc sulfide to the above neutralization final liquid so that the total turbidity thereof falls substantially in the range from 100 to 400 NTU.

In addition, according to the sixth aspect of the present invention, there is provided the separation method for zinc sulfide, characterized in that in the fifth aspect, an amount of the above suspended solid comprising the above neutralized precipitate and the leach residue is adjusted to an amount corresponding to the turbidity of 20 to 100 NTU, and also an addition amount of the above zinc sulfide is an amount corresponding to the rest of the above total turbidity in that case.

The separation method for zinc sulfide of the present invention makes it possible to improve filtration performance of zinc sulfide formed, prevent clogging of the filter cloth, and reduce a frequency of washing operation or replacement operation of the filter cloth, and also to recover nickel which has been lost by accompanying to zinc sulfide, in the zinc removal step in which zinc sulfide is formed by adding a hydrogen sulfide gas to the above neutralization final liquid containing zinc as well as nickel and cobalt, said zinc sulfide is separated, to obtain a mother liquid for nickel recovery containing nickel and cobalt, therefore, its industrial worth is extremely great.

NOTATION

Figure 1:
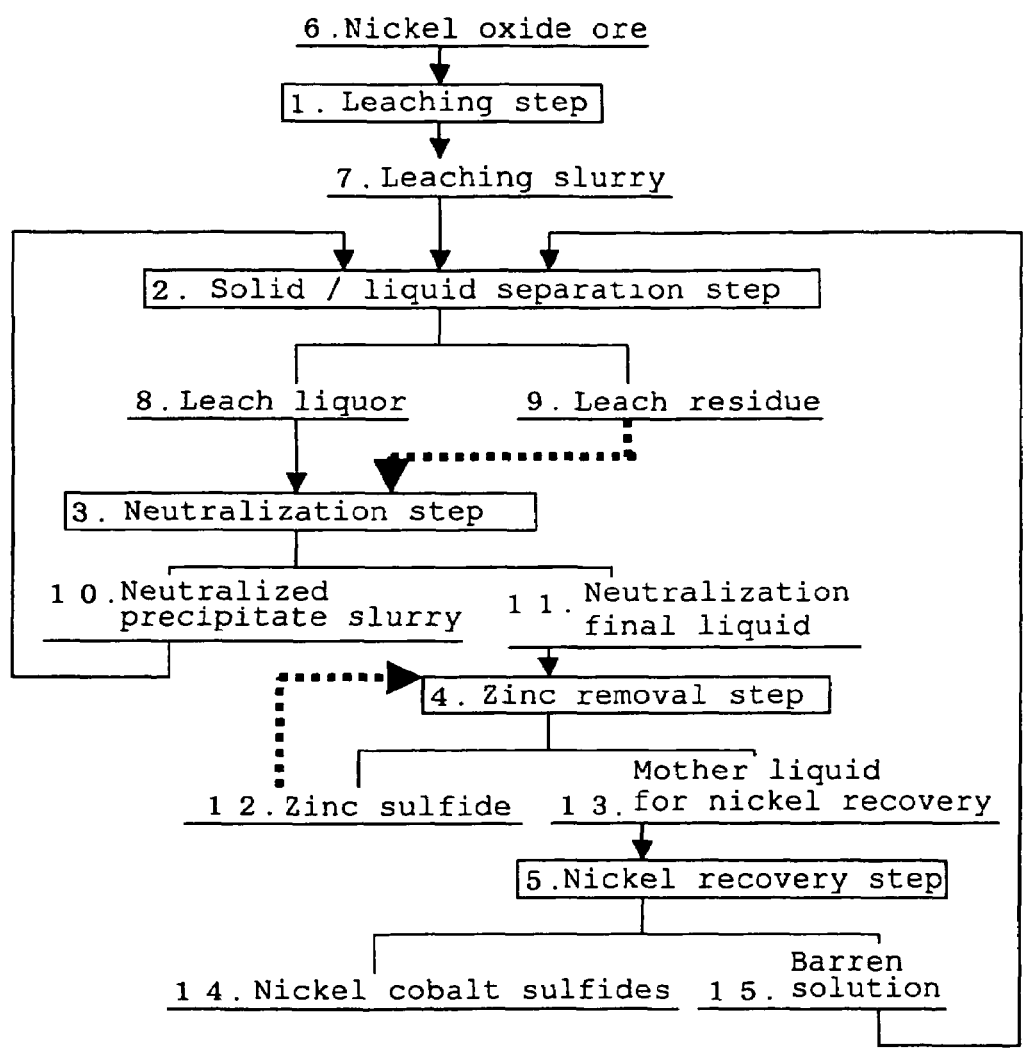
FIG. 1 is a flow sheet representing one example of embodiment of the hydrometallurgical process for nickel oxide ore by the High Pressure Acid Leach comprising sulfurization step of zinc.

1 Leaching step
2 Solid/liquid separation step
3 Neutralization step
4 Zinc removal step
5 Nickel recovery step
6 Nickel oxide ore
7 Leaching slurry
8 Leach liquor
9 Leach residue
10 Neutralized precipitate slurry
11 Neutralization final liquid
12 Zinc sulfide
13 Mother liquid for nickel recovery
14 Nickel cobalt sulfides
15 Barren solution

DETAILED DESCRIPTION OF THE INVENTION

Hereinafter, the separation method for zinc sulfide of the present invention will be explained in detail.

The separation method for zinc sulfide of the present invention, in the hydrometallurgy by a High Pressure Acid Leach process for nickel oxide ore comprising the following steps, is characterized in that the following leach residue is added to the following leach liquor and pH of the following neutralization final liquid is adjusted so as to fall in the range from 3.0 to 3.5 in the following neutralization step, and a suspended solid comprising the neutralized precipitate and the leach residue is kept remained in said neutralization final liquid so that turbidity thereof falls in the range from 100 to 400 NTU in the following zinc removal step.

(a) A leaching and solid/liquid separation step in which sulfuric acid is added to a slurry of nickel oxide ore, leaching is conducted under a high temperature and pressure, then the residue is separated while the leached slurry is subjected to a multistage washing, to obtain a leach liquor containing impurity elements as well as nickel and cobalt;

(b) a neutralization step in which pH of the above leach liquor is adjusted and neutralized precipitate containing the impurity elements is separated, to obtain a neutralization final liquid containing zinc as well as nickel and cobalt.

(c) a zinc removal step in which zinc sulfide is formed by adding a hydrogen sulfide gas to the above neutralization final liquid and said zinc sulfide is separated, to obtain a mother liquid for nickel recovery containing nickel and cobalt; and (d) a nickel recovery step in which mixed sulfide containing nickel and cobalt are formed by adding a hydrogen sulfide gas to the above mother liquid for nickel recovery, and said mixed sulfide are separated.

In the separation method of the present invention, it is important that the leach residue is added to the leach liquor in the above-described neutralization step, and the suspended solid comprising the neutralized precipitate and the leach residue are kept remained in the neutralization final liquid so that turbidity thereof falls in the range from 100 to 400 NTU, preferably in the range from 100 to 200 NTU in the above-described zinc removal step. By processing in this way, since the sulfurization reaction proceeds using the suspended solid in liquid as nuclei, a ratio of fine particles in zinc sulfide formed becomes less in comparison with that in a case of zinc sulfide formed without the suspended material. For this reason, in the present invention, zinc sulfide having a lower viscosity is formed in comparison with that in a case of zinc sulfide formed without the suspended material. As described above, since filtration performance of zinc sulfide can be improved due to the decreased ratio of fine particles in zinc sulfide and the reduced viscosity of zinc sulfide, clogging of a filter cloth becomes difficult to occur, and a frequency of washing operation or replacement operation of a filter cloth can be drastically reduced.

Namely, when turbidity of the neutralization final liquid is less than 100 NTU, since an amount of the suspended solid is less and an effect as nuclei is small, growth of particles requires a great time, and an effect to improve filtration performance is low. On the contrary, when turbidity of the neutralization final liquid exceeds 400 NTU, since an amount of the suspended solid as nuclei is too much and particle size cannot grow up sufficiently in reverse, filtration performance becomes worse.

The above-described adjustment of turbidity can be performed by placing a turbidity meter in a channel where the neutralization final liquid is charged into the zinc removal step to monitor turbidity, and finally adjusting an addition amount of a flocculant in the neutralization step so that the turbidity is maintained in the above-described range.

The hydrometallurgy for nickel oxide ore by the High Pressure Acid Leach to be used in the above-described separation method is carried out, for example, according to the process flow represented in FIG. 1. FIG. 1 is a flow sheet representing an example of embodiment of a hydrometallurgical process for nickel oxide ore by the High Pressure Acid Leach comprising a zinc removal step. It should be noted that, the dotted lines in the figure show a channel by which the leach residue is added to the neutralization step of the present invention and a channel by which zinc sulfide is repeatedly added.

In FIG. 1, nickel oxide ore 6 is, firstly in leach step 1, subjected to a High Pressure Acid Leach to form leaching slurry 7. Leaching slurry 7 is then subjected to solid/liquid separation step 2, and after a multistage washing, separated to leach liquor 8 containing nickel and cobalt and leach residue 9. Leach liquor 8 is subjected to neutralization step 3 to form neutralized precipitate slurry 10 containing trivalent ferric hydroxide and neutralization final liquid 11. Subsequently, neutralization final liquid 11 is subjected to zinc removal step 4, and separated to zinc sulfide 12 and mother liquid 13 for nickel recovery. Finally, mother liquid 13 for nickel recovery is subjected to nickel recovery step 5 and separated to nickel cobalt sulfides 14 and barren liquid 15 from which nickel etc. have been eliminated.

In the separation method of the present invention, in neutralization step 3, leach residue 9 is added to leach liquor 8, and pH of neutralization final liquid 11 is adjusted so as to fall in the range from 3.0 to 3.5, preferably in the range from 3.1 to 3.2. Namely, under a reaction condition where final pH becomes less than 3.0, a hydrolytic reaction does not proceed because neutralization of free acid is insufficient, and concentrations of impurity elements such as iron, aluminum, chromium do not decrease to their target values. In addition, another reason is that zinc sulfide 12 formed in zinc removal step 4 as the next step dissolves again. On the contrary, under a reaction condition where a final pH exceeds 3.5, control of an amount of suspended solid (fine particle component) contained in the liquid is difficult, and an amount of the particles brought into zinc removal step 4 becomes more. As a result, filtration performance of the slurry in zinc removal step 4 is worsened. In addition, in zinc removal step 4, not only zinc but also a part of nickel and cobalt deposits.

Adjustment of pH in the above-described neutralization step may be performed by adjusting an addition amount of a neutralizing agent. As the above-described neutralizing agent, an aqueous solution or a slurry of alkali metal hydroxides and/or alkali metal carbonate salts can be used, but preferably industrially cheap calcium carbonate is used. In this case, each impurity element is hydrolyzed by neutralization of free acid and precipitates or deposits as shown by the following reaction equations (1) to (4).

$$H_2SO_4 + CaCO_3 + H_2O = CaSO_4 \cdot 2H_2O + CO_2 \uparrow \quad \text{Reaction Equation (1):}$$

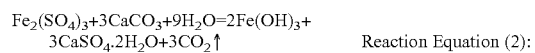
$$Fe_2(SO_4)_3 + 3CaCO_3 + 9H_2O = 2Fe(OH)_3 + 3CaSO_4 \cdot 2H_2O + 3CO_2 \uparrow \quad \text{Reaction Equation (2):}$$

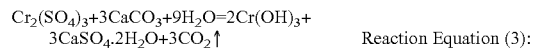
$$Cr_2(SO_4)_3 + 3CaCO_3 + 9H_2O = 2Cr(OH)_3 + 3CaSO_4 \cdot 2H_2O + 3CO_2 \uparrow \quad \text{Reaction Equation (3):}$$

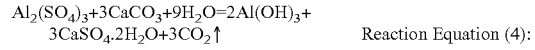
$$Al_2(SO_4)_3 + 3CaCO_3 + 9H_2O = 2Al(OH)_3 + 3CaSO_4 \cdot 2H_2O + 3CO_2 \uparrow \quad \text{Reaction Equation (4):}$$

In the above-described separation method, an amount of the leach residue to be added to the leach liquor in the neutralization step is not particularly limited, but in order to keep the suspended solid comprising the neutralized precipitate and the leach residue remained in the neutralization final liquid so that turbidity thereof falls in the range from 100 to 400 NTU in the zinc removal step, preferably the addition amount is 7 to 22.5 g per 1 L of the leach liquor. Namely, an amount of the suspended solid comprising the neutralized precipitate and the leach residue in the neutralization final liquid brought into the zinc removal step is finally adjusted by an addition amount of a flocculant in the neutralization step, but turbidity can be adjusted within the prescribed range by adding the leach residue to the leach liquor within the above-described range. In this connection, when the addition amount of leach residue exceeds 22.5 g per 1 L of the leach liquor, an amount of the leach residue becomes too much and turbidity exceeds 400 NTU. On the contrary, when the addition amount of leach residue is less than 7 g per 1 L of the leach liquor, turbidity becomes less than 100 NTU.

As an addition method of the above-described leach residue, preferably, for example, after adjusting the leach residue slurry so that a slurry concentration becomes 1.4 to 1.5 t/m$^3$, the leach residue slurry is added in a flow rate ratio of 0.5 to 1.5% by mass relative to said leach liquor.

In the above-described separation method, a method for forming zinc sulfide in the above-described zinc removal step is not particularly limited, and, for example, a method is used in which the above-described neutralization final liquid containing zinc as well as nickel and cobalt is introduced into a pressurized container and also a hydrogen sulfide gas is brown into the gas phase in the container to sulfurize zinc selectively against nickel and cobalt. Namely, by blowing a hydrogen sulfide gas into the gas phase in the pressurized container so as to reach to a prescribed concentration, an oxidation-reduction potential of the liquid phase can be controlled, zinc can be selectively sulfurized against nickel and cobalt with using the neutralization final liquid under the above-described pH condition.

AS the above-described separation method, the leach residue is added to the leach liquor in the neutralization step, further at the same time a part of zinc sulfide formed can be repeatedly added into the neutralization final liquid in the zinc removal step. On this occasion, the above-described suspended solid comprising zinc sulfide as well as the neutralized precipitate and the leach residue are formed by adding zinc sulfide so that the total turbidity thereof falls substantially in the range from 100 to 400 NTU. Namely, since zinc sulfide to be repeatedly added has been filtered by a filtration equipment already and has a particle size of several to 10 to 20 μm, which is appropriate as a seed crystal, the particle size of zinc sulfide to be formed in the zinc removal step is further grown up, and thereby an effect of improving filtration performance can be more stably obtained. Further, nickel, which had been lost, can be recovered by returning the nickel contained in zinc sulfide, which had been conventionally discharged out of the system, into the process.

In this occasion, a ratio of the above-described zinc sulfide to be added is not particularly limited, but preferably an amount of the above suspended solid comprising the neutralized precipitate and the leach residue is adjusted to an amount corresponding to a turbidity in the range from 20 to 100 NTU and also an amount of zinc sulfide is adjusted to an amount corresponding to the rest of the above total turbidity in that occasion. Namely, an amount of the suspended solid comprising the neutralized precipitate and the leach residue is adjusted to the range from around 20 to around 100 NTU in turbidity equivalent, and the suspended solid corresponding to the shortfall may be compensated by zinc sulfide. That is, turbidity is measured when zinc sulfide is added to the neutralization final liquid containing the suspended solid comprising the neutralized precipitate and the leach residue, and the turbidity is controlled so as to fall in the range from 100 to 400 NTU, preferably in the range from 100 to 200 NTU. In this occasion, by controlling a concentration and an amount of the zinc sulfide slurry to be added within appropriate ranges in advance, the zinc sulfide can be directly added into a sulfurization reaction tank in the zinc removal step. It should be noted that, this addition of zinc sulfide can be easily performed by placing a recovery tank for zinc sulfide slurry in the downstream of the filtration equipment in the zinc removal step, and installing a flow meter and a turbidity meter in the channel for repeated charging.

EXAMPLES

Hereinafter, the present invention will be explained in more detail by means of Examples and Comparative Examples of the present invention, but the present invention is not limited by these Examples. It should be noted that, analyses of metals, measurement on turbidity of zinc sulfide, and evaluations on filtration performance and amount of recovered nickel were conducted as follows.

(1) Analysis method of metal: ICP emission spectrometry was used.
(2) Measurement of turbidity of zinc sulfide: A transmittance measurement type turbidity meter (produced by LaMotte Co., Type 2020) and Forumajin turbidity standard liquid (produced by LaMotte Co.) as a standard liquid were used. It should be noted that, the above-described turbidity meter is of a transmitted and scattered light system in which a transmitted light and a light scattered in 90 degree against the incident angle of the light (90 degree scattered light) are measured and turbidity is converted from a ratio of these intensities, and unit of turbidity is NTU.
(3) Evaluation on filtration performance of zinc sulfide: Evaluation was made by measuring a filtration rate when a zinc sulfide slurry (100 mL) obtained after completing the zinc removal step was filtrated using a filter paper (0.45 μm). In Table 1, the following symbols were used: "X" for the case when filtration rate is less than 10 m$^3$/m$^2$·h, "○" for the case when filtration rate is 10 to 18 m$^3$/m$^2$·h, and "⊚" for the case when filtration rate exceeds 18 m$^3$/m$^2$·h.
(4) Evaluation on amount of recovered nickel: Evaluation was made by a recovery ratio relative to an amount of nickel lost by accompanying to zinc sulfide in the past. In Table 1, the following symbols were used: "X" for the case when recovery ratio is less than 40%, "○" for the case when recovery ratio is 40 to 70%, and "⊚" for the case when filtration rate exceeds 70%.

Example 1

A leach liquor and a leach residue produced from the refining plant using the High Pressure Acid Leach for nickel oxide ore according to the process flow in FIG. 1 were used. It should be noted that, the above leach liquor (neutralization initial liquid) had a composition having a nickel concentration of 4.1 g/L, a cobalt concentration of 0.3 g/L, an iron concentration of 1.2 g/L, and a zinc concentration of 0.07 g/L, and pH was 2.5. In addition, the leach residue had a composition having a Ni content of 0.1% by mass or less, a Co content of 0.01% by mass or less, a Fe content of 52% by mass, and a Zn content of 0.02% by mass.

(1) Neutralization Step

Firstly, in the neutralization step, after the above-described leach residue obtained from the leaching step was adjusted to a slurry having a concentration of 1.45 t/m$^3$, the leach residue was added in a flow rate ratio of 1.5% by mass relative to the above-described leach liquor. Namely, the leach residue of 21.8 g per 1 L of the leach liquor was added.

Here, pH was adjusted to 3.2 by adding a CaCO$_3$ slurry (concentration: around 25% by mass) as a neutralizing agent, and an amount of suspended solid comprising the neutralized precipitate and the leach residue in the filtrate was adjusted by adjusting an addition amount of a flocculant, to obtain a neutralization final liquid in which turbidity was adjusted to 100 NTU. Here, as a filtration equipment, a sedimentation separation type filtering machine was used.

It should be noted that, the obtained neutralization final liquid had a composition having a nickel concentration of 4.1 g/L, a cobalt concentration of 0.3 g/L, an iron concentration of 0.4 g/L, and a zinc concentration of 0.07 g/L, and pH was 3.2.

(2) Zinc Removal Step

Next, in the zinc removal step, the above-described neutralization final liquid was charged to a sulfurization reaction tank, and a gas for sulfurizing was charged in the gas phase section of the tank, so that a pressure in the tank was maintained at 0.02 MPa, to form zinc sulfide, which was then separated by a filter press. Here, the neutralization final liquid was continuously charged into the sulfurization reaction tank, and subjected to the reaction with stirring while temperature of the liquid was maintained at 55° C.

Here, the obtained zinc removal final liquid had a composition having a nickel concentration of 4.1 g/L, a cobalt concentration of 0.3 g/L, an iron concentration of 0.4 g/L, and a zinc concentration of 0.001 g/L or less, and pH was 3.2. In addition, the zinc sulfide had a composition having a Ni content of 0.1% by mass, a Co content of 0.1% by mass or less, a Fe content of 4.7% by mass, and a Zn content of 7.9% by mass.

After that, evaluations on filtration performance of the obtained zinc sulfide and amount of recovered nickel were carried out. Results are shown in Table 1.

Example 2

The same procedures were carried out in the same manner as in Example 1 except that in the neutralization step, the leach residue was added in a flow rate ratio of 1.0% by mass relative to the leach liquor (14.5 g per 1 L of the leach liquor) and turbidity of the neutralization final liquid was adjusted to 253 NTU. After that, evaluations on filtration performance of the zinc sulfide obtained and amount of recovered nickel were carried out. Results are shown in Table 1.

Example 3

The same procedures were carried out in the same manner as in Example 1 except that in the neutralization step, pH was adjusted to 3.3 and turbidity of the neutralization final liquid was adjusted to 354 NTU. After that, evaluations on filtration performance of the obtained zinc sulfide and amount of recovered nickel were carried out. Results are shown in Table 1.

Example 4

The same procedures were carried out in the same manner as in Example 1 except that in the neutralization step, the leach residue was added in a flow rate ratio of 0.5% by mass relative to the leach liquor (7.3 g per 1 L of the leach liquor), pH was adjusted to 3.4, and turbidity of the neutralization final liquid was adjusted to 385 NTU. After that, evaluations on filtration performance of the obtained zinc sulfide and amount of recovered nickel were carried out. Results are shown in Table 1.

Example 5

The same procedures were carried out in the same manner as in Example 1 except that in the neutralization step, the leach residue was added in a flow rate ratio of 0.5% by mass relative to the leach liquor (7.3 g per 1 L of the leach liquor), turbidity of the neutralization final liquid was adjusted to 90 NTU, and further in the zinc removal step, turbidity of the zinc removal initial liquid was adjusted substantially to 350 NTU by adding zinc sulfide to the obtained neutralization final liquid. After that, evaluations on filtration performance of the zinc sulfide obtained and amount of recovered nickel were carried out. Results are shown in Table 1.

Example 6

The same procedures were carried out in the same manner as in Example 1 except that in the neutralization step, the leach residue was added in a flow rate ratio of 0.5% by mass relative to the leach liquor (7.3 g per 1 L of the leach liquor), turbidity of the neutralization final liquid was adjusted to 20 NTU, and further in the zinc removal step, turbidity of the zinc removal initial liquid was adjusted substantially to 130 NTU by adding zinc sulfide to the obtained neutralization final liquid. After that, evaluations on filtration performance of the zinc sulfide obtained and amount of recovered nickel were carried out. Results are shown in Table 1.

Example 7

The same procedures were carried out in the same manner as in Example 1 except that in the neutralization step, the leach residue was added in a flow rate ratio of 0.5% by mass relative to the leach liquor (7.3 g per 1 L of the leach liquor), pH was adjusted to 3.3, turbidity of the neutralization final liquid was adjusted to 150 NTU, and further in the zinc removal step, turbidity of the zinc removal initial liquid was adjusted substantially to 180 NTU by adding zinc sulfide to the obtained neutralization final liquid. After that, evaluations on filtration performance of the zinc sulfide obtained and amount of recovered nickel were carried out. Results are shown in Table 1.

Example 8

The same procedures were carried out in the same manner as in Example 1 except that in the neutralization step, the leach residue was added in a flow rate ratio of 0.5% by mass relative to the leach liquor (7.3 g per 1 L of the leach liquor), pH was adjusted to 3.4, turbidity of the neutralization final liquid was adjusted to 385 NTU, and further in the zinc removal step, turbidity of the zinc removal initial liquid was adjusted substantially to 395 NTU by adding zinc sulfide to the obtained neutralization final liquid. After that, evaluations on filtration performance of the zinc sulfide obtained and amount of recovered nickel were carried out. Results are shown in Table 1.

Comparative Example 1

The same procedures were carried out in the same manner as in Example 1 except that in the neutralization step, pH was adjusted to 2.9, and turbidity of the neutralization final liquid was adjusted to 220 NTU. After that, evaluations on filtration performance of the zinc sulfide obtained and amount of recovered nickel were carried out. Results are shown in Table 1.

Comparative Example 2

The same procedures were carried out in the same manner as in Example 1 except that in the neutralization step, the leach residue was not added, and turbidity of the neutralization final liquid was adjusted to 325 NTU. After that, evaluations on filtration performance of the obtained zinc sulfide and amount of recovered nickel were carried out. Results are shown in Table. 1.

Comparative Example 3

The same procedures were carried out in the same manner as in Example 1 except that in the neutralization step, the leach residue was added in a flow rate ratio of 2.0% by mass relative to the leach liquor (29 g per 1 L of the leach liquor), and turbidity of the neutralization final liquid was adjusted to 521 NTU. After that, evaluations on filtration performance of the obtained zinc sulfide and amount of recovered nickel were carried out. Results are shown in Table 1.

Comparative Example 4

The same procedures were carried out in the same manner as in Example 1 except that in the neutralization step, the leach residue was added in a flow rate ratio of 0.5% by mass relative to the leach liquor (7.3 g per 1 L of the leach liquor), pH was adjusted to 3.1, turbidity of the neutralization final liquid was adjusted to 35 NTU, and further in the zinc removal step, turbidity of the zinc removal initial liquid was adjusted substantially to 60 NTU by adding zinc sulfide to the obtained neutralization final liquid. After that, evaluations on filtration performance of the obtained zinc sulfide and amount of recovered nickel were carried out. Results are shown in Table 1.

Comparative Example 5

The same procedures were carried out in the same manner as in Example 1 except that in the neutralization step, the leach residue was added in a flow rate ratio of 0.5% by mass relative to the leach liquor (7.3 g per 1 L of the leach liquor), pH was adjusted to 2.9, turbidity of the neutralization final liquid was adjusted to less than 10 NTU, and further in the zinc removal step, turbidity of the zinc removal initial liquid was adjusted substantially to 170 NTU by adding zinc sulfide to the obtained neutralization final liquid. After that, evaluations on filtration performance of the obtained zinc sulfide and amount of recovered nickel were carried out. Results are shown in Table 1.

Comparative Example 6

The same procedures were carried out in the same manner as in Example 1 except that in the neutralization step, the leach residue was added in a flow rate ratio of 0.5% by mass relative to the leach liquor (7.3 g per 1 L of the leach liquor), turbidity of the neutralization final liquid was adjusted to 170 NTU, and further in the zinc removal step, turbidity of the zinc removal initial liquid was adjusted substantially to 410 NTU by adding zinc sulfide to the obtained neutralization final liquid. After that, evaluations on filtration performance of the obtained zinc sulfide and amount of recovered nickel were carried out. Results are shown in Table 1.

Comparative Example 7

The same procedures were carried out in the same manner as in Example 1 except that in the neutralization step, the leach residue was added in a flow rate ratio of 0.5% by mass relative to the leach liquor (7.3 g per 1 L of the leach liquor), pH was adjusted to 3.3, turbidity of the neutralization final liquid was adjusted to 354 NTU, and further in the zinc removal step, turbidity of the zinc removal initial liquid was adjusted substantially to 430 NTU by adding zinc sulfide to the obtained neutralization final liquid. After that, evaluations on filtration performance of the obtained zinc sulfide and amount of recovered nickel were carried out. Results are shown in Table 1.

Comparative Example 8

The same procedures were carried out in the same manner as in Example 1 except that in the neutralization step, the leach residue was added in a flow rate ratio of 0.5% by mass relative to the leach liquor (7.3 g per 1 L of the leach liquor), pH was adjusted to 3.0, turbidity of the neutralization final liquid was adjusted to 25 NTU, and further in the zinc removal step, turbidity of the zinc removal initial liquid was adjusted substantially to 420 NTU by adding zinc sulfide to the obtained neutralization final liquid. After that, evaluations on filtration performance of the obtained zinc sulfide and amount of recovered nickel were carried out. Results are shown in Table 1.

TABLE 1

| | pH of neutralization final liquid | Addition amount of leach residue (g)* | Turbidity of neutralization Final liquid (NTU) | Turbidity of zinc removal initial liquid (NTU) | Filtration performance of zinc sulfide | Nickel recovery ratio |
|---|---|---|---|---|---|---|
| Example 1 | 3.2 | 21.8 | 100 | — | ○ | — |
| Example 2 | 3.2 | 14.5 | 253 | — | ⊚ | — |
| Example 3 | 3.3 | 21.8 | 354 | — | ⊚ | — |
| Example 4 | 3.4 | 7.3 | 385 | — | ○ | — |
| Example 5 | 3.2 | 7.3 | 90 | 350 | ○ | ○ |
| Example 6 | 3.2 | 7.3 | 20 | 130 | ⊚ | ⊚ |
| Example 7 | 3.3 | 7.3 | 150 | 180 | ⊚ | ⊚ |
| Example 8 | 3.4 | 7.3 | 385 | 395 | ○ | ○ |
| Comparative Example 1 | 2.9 | 21.8 | 220 | — | X | — |
| Comparative Example 2 | 3.2 | 0 | 325 | — | X | — |
| Comparative Example 3 | 3.2 | 29 | 521 | — | X | — |
| Comparative Example 4 | 3.1 | 7.3 | 35 | 60 | X | X |
| Comparative Example 5 | 2.9 | 7.3 | <10 | 170 | X | X |
| Comparative Example 6 | 3.2 | 7.3 | 170 | 410 | X | X |

TABLE 1-continued

|  | pH of neutralization final liquid | Addition amount of leach residue (g)* | Turbidity of neutralization Final liquid (NTU) | Turbidity of zinc removal initial liquid (NTU) | Filtration performance of zinc sulfide | Nickel recovery ratio |
|---|---|---|---|---|---|---|
| Comparative Example 7 | 3.2 | 7.3 | 354 | 430 | X | X |
| Comparative Example 8 | 3.0 | 7.3 | 25 | 420 | X | X |

*Addition ratio per 1 L of leach liquor
Filtration rate: "X" means less than 10 m$^3$/m$^2$ · h, "○" means 10 to 18 m$^3$/m$^2$ · h, "◎" means over 18 m$^3$/m$^2$ · h.
Nickel recovery ratio: "X" means less than 40%, "○" means 40 to 70%, and "◎" means over 70%, based on amount of nickel lost by accompanying to zinc sulfide From Table 1, it can be understood that, since in Examples 1 to 4, in the neutralization step, the leach residue is added to the leach liquor, and pH of the neutralization final liquid is adjusted to 3.0 to 3.5, and at the same time, turbidity of the neutralization final liquid (zinc removal initial liquid) is adjusted so as to fall in the range from 100 to 400 NTU, and in Examples 5 to 8, further in the zinc removal step, turbidity of the zinc removal initial liquid is adjusted so as to fall in the range from 100 to 400 NTU by adding the zinc sulfide to the neutralization final liquid, according to the method of the present invention, in the zinc removal step, filtration performance of zinc sulfide formed can be improved, and at the same time decrease of nickel recovery ratio can be inhibited.

On the contrary, it can be understood that since in Comparative Examples 1 to 8, in the neutralization step, addition amounts of the leach residue or pH, or a substantial turbidities of the zinc removal initial liquid after the addition of zinc sulfide do not conform to the these conditions, in the filtration performance of zinc sulfide to be formed or the nickel recovery, ratio satisfactory results cannot be obtained.

As obvious from the above, the separation method for zinc sulfide of the present invention is suitable as a method for improving filtration performance when zinc is eliminated and separated as sulfide thereof from a sulfuric acid aqueous solution containing, particularly, zinc as an impurity element.

What is claimed is:

1. A separation method for zinc sulfide in a hydrometallurgical process by a high pressure acid leach for nickel oxide ore comprising:
   (a) a leaching and solid/liquid separation step in which sulfuric acid is added to a slurry of nickel oxide ore, leaching is conducted under high temperature and high pressure, then a leach residue is separated while the leaching slurry is subjected to a multistage washing, to obtain a leach liquor containing impurity elements as well as nickel and cobalt;
   (b) a neutralization step in which pH of the leach liquor is adjusted and a neutralized precipitate containing impurity elements is separated, to obtain a neutralization final liquid containing zinc as well as nickel and cobalt;
   (c) a zinc removal step in which zinc sulfide is formed by adding a hydrogen sulfide gas to the neutralization final liquid and the zinc sulfide is separated, to obtain a mother liquid for nickel recovery containing nickel and cobalt; and
   (d) a nickel recovery step in which mixed sulfide containing nickel and cobalt are formed by adding a hydrogen sulfide gas to the mother liquid for nickel recovery, and said mixed sulfide is separated,
   wherein the leach residue is added to the leach liquor and pH of the neutralization final liquid is adjusted so as to fall in the range from 3.0 to 3.5 in the neutralization step, and that a suspended solid comprising said neutralized precipitate and said leach residue is kept in the neutralization final liquid so that the turbidity thereof falls in the range from 100 to 400 NTU in the zinc removal step.

2. The separation method for zinc sulfide according to claim 1, characterized in that in the neutralization step, an amount of the leach residue to be added to the leach liquor is 7 to 22.5 g/L of the leach liquor.

3. The separation method for zinc sulfide according to claim 2, characterized in that the leach residue is adjusted to the leach residue slurry having a concentration within the range from 1.4 to 1.5 t/m$^3$, then the leach residue slurry is added in a flow ratio of 0.5 to 1.5% by mass relative to the leach liquor.

4. The separation method for zinc sulfide according to claim 1, characterized in that the turbidity is carried out by adjusting an addition amount of a flocculant in the said neutralization step to adjust an amount of the suspended solid comprising the neutralized precipitate and the leach residue in the neutralization final liquid.

5. The separation method for zinc sulfide according to claim 1, characterized in that in the zinc removal step, a suspended solid comprising zinc sulfide as well as the neutralized precipitate and the leach residue is formed by further adding the zinc sulfide to the neutralization final liquid so that the total turbidity thereof falls in the range from 100 to 400 NTU.

6. The separation method for zinc sulfide according to claim 5, characterized in that an amount of the suspended solid comprising the neutralized precipitate and the leach residue is adjusted to an amount corresponding to the turbidity of 20 to 100 NTU, and an addition amount of the zinc sulfide is corresponding to the amount of the rest of the total turbidity in that case.

7. The separation method for zinc sulfide according to claim 2, characterized in that the turbidity is carried out by adjusting an addition amount of a flocculant in the neutralization step to adjust an amount of the suspended solid comprising the neutralized precipitate and the leach residue in the neutralization final liquid.

8. The separation method for zinc sulfide according to claim 3, characterized in that the turbidity is carried out by adjusting an addition amount of a flocculant in the neutralization step to adjust an amount of the suspended solid comprising the neutralized precipitate and the leach residue in the neutralization final liquid.

9. The separation method for zinc sulfide according to claim 2, characterized in that in the zinc removal step, a suspended solid comprising zinc sulfide as well as the neutralized precipitate and the leach residue is formed by further adding the zinc sulfide to the neutralization final liquid so that the total turbidity thereof falls in the range from 100 to 400 NTU.

10. The separation method for zinc sulfide according to claim 3, characterized in that in the zinc removal step, a suspended solid comprising zinc sulfide as well as the neutralized precipitate and the leach residue is formed by further adding the zinc sulfide to the neutralization final liquid so that the total turbidity thereof falls in the range from 100 to 400 NTU.

11. The separation method for zinc sulfide according to claim 9, characterized in that an amount of the suspended solid comprising the neutralized precipitate and the leach residue is adjusted to an amount corresponding to the turbidity of 20 to 100 NTU, and an addition amount of the zinc sulfide is corresponding to the amount of the rest of the total turbidity in that case.

12. The separation method for zinc sulfide according to claim 10, characterized in that an amount of the suspended solid comprising the neutralized precipitate and the leach residue is adjusted to an amount corresponding to the turbidity of 20 to 100 NTU, and an addition amount of the zinc sulfide is corresponding to the amount of the rest of the total turbidity in that case.

* * * * *